(12) United States Patent
Matsumura

(10) Patent No.: US 8,090,311 B2
(45) Date of Patent: Jan. 3, 2012

(54) COMMUNICATION TERMINALS AND MOBILE COMMUNICATION SYSTEM INCLUDING THE SAME

(75) Inventor: Takashi Matsumura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 569 days.

(21) Appl. No.: 11/721,536

(22) PCT Filed: Dec. 13, 2005

(86) PCT No.: PCT/JP2005/022880
§ 371 (c)(1),
(2), (4) Date: Oct. 14, 2009

(87) PCT Pub. No.: WO2006/064804
PCT Pub. Date: Jun. 22, 2006

(65) Prior Publication Data
US 2010/0056161 A1      Mar. 4, 2010

(30) Foreign Application Priority Data
Dec. 13, 2004  (JP) .............................. P2004-360055

(51) Int. Cl.
*H04B 3/36* (2006.01)
*H04B 7/14* (2006.01)
*H04B 7/15* (2006.01)

(52) U.S. Cl. .......................................... 455/11.1; 455/7

(58) Field of Classification Search .............. 455/7, 11.1
See application file for complete search history.

(56) References Cited

U.S. PATENT DOCUMENTS

| 6,954,612 | B2 * | 10/2005 | Cheng et al. ................. 455/11.1 |
| 7,489,668 | B2 * | 2/2009 | Cho et al. ....................... 370/338 |
| 7,813,695 | B2 * | 10/2010 | Haartsen ....................... 455/11.1 |

(Continued)

FOREIGN PATENT DOCUMENTS
JP   2002-171287   6/2002
(Continued)

OTHER PUBLICATIONS

Japanese language notice of reasons for rejection dated Oct. 26, 2010 and its English language translation for corresponding Japanese application 2006-548855 lists the reference above.

*Primary Examiner* — Marivelisse Santiago Cordero
(74) *Attorney, Agent, or Firm* — DLA Piper LLP (US)

(57) ABSTRACT

The transmission speed of downlink communication information to be received by communication terminals has been improved. A mobile communication system comprises a plurality of communication terminals that wirelessly communicate with each other; and a base station that is requested, based on the transmission speeds of the communication terminals, by the communication terminals to transmit downlink communication information. Each local communication terminal has a relay requesting device that receives information on the transmission speed of another communication terminal and that, when the transmission speed of the other communication terminal is greater than that of the local communication terminal, transmits, to the other communication terminal, identification information to be used for the base station to identify the local communication terminal or the other communication terminal, thereby requesting the other communication terminal to relay communication information addressed to the local communication terminal. The base station has a terminal identifying/transmitting device that transmits, based on the identification information of the local communication terminal, the communication information addressed to the local communication terminal to the local communication terminal via the other communication terminal.

8 Claims, 5 Drawing Sheets

U.S. PATENT DOCUMENTS

| | | | |
|---|---|---|---|
| 2004/0057409 A1 | 3/2004 | Kennedy | 370/338 |
| 2005/0227616 A1 | 10/2005 | Takatani et al. | 455/11.1 |

FOREIGN PATENT DOCUMENTS

| | | |
|---|---|---|
| JP | 2002198892 A | 7/2002 |
| JP | 2003-309512 | 10/2003 |
| JP | 2004-248210 | 9/2004 |
| JP | 2005-513931 | 5/2005 |
| JP | 2006-500872 | 1/2006 |

\* cited by examiner

FIG. 5

EXTENDED DRC FRAME HAVING ADDED MAC ADDRESS

| MAC ADDRESS | DRC |
|---|---|
| 6bit | 4bit |

COMMUNICATION TERMINALS AND MOBILE COMMUNICATION SYSTEM INCLUDING THE SAME

CROSS-REFERENCE TO THE RELATED APPLICATIONS

This application is a national phase of international application No. PCT/JP2005/022880, filed Dec. 13, 2005, the entire contents of which are incorporated by reference. This application also claims benefit of priority under 35 USC 119 to Japanese Patent Application No. 2004-360055, filed Dec. 13, 2004, the entire contents of which are incorporated by reference.

TECHNICAL FIELD

The present invention relates to communication terminals for requesting a base station to transmit downlink communication information based on a transmission speed computed according to a reception state of a local station, and a mobile communication system having the same.

This application claims priority of Japanese Patent Application No. 2004-360055 filed on Dec. 13, 2004, the entire disclosure of which is hereby incorporated by reference.

BACKGROUND ART

In general, there is known a wireless communication system (for example, Code Division Multiple Access 2000 1×Evolution-Data Optimized (CDMA2000 1×EV-DO) or the like) for variably controlling a transmission speed of downlink communication information (hereinafter, referred to as a "downlink transmission speed") according to a reception state in a communication terminal. This wireless communication system is a wireless communication scheme that can enable the trade-off of a downlink transmission speed, error resilience, and the like according to multiple modulation schemes/spreading ratios and that can provide a high transmission speed according to a reception state of a communication terminal. In this wireless communication scheme, a communication terminal measures the reception quality (or Carrier to Interference Ratio (CIR)) of a signal received from a base station and provides the base station with a request for an estimated highest downlink transmission speed at which data can be received at a predefined error rate or less. On the other hand, the base station receives downlink transmission speed requests from a plurality of communication terminals, schedules the requests, and performs communication by determining a communication terminal serving as a destination of downlink communication information. The scheduling process for determining the transmission destination is performed in an arbitrary scheme, but is generally performed using a scheduling algorithm called Proportional Fair. This scheduling process is constructed with a scheme for balancing the fairness of transmission speeds between multiple subscribers and the maximization of total throughput of the base station, calculates a previous average communications traffic R (which uses a moving average or logarithm window average and generally corresponds to an average for the previous 1 second period) with respect to each communication terminal and assigns downlink communication information to a communication terminal in which a requested downlink transmission speed (DRC) to average communications traffic (R) ratio, that is, DRC/R, is highest (for example, see Patent Document 1).

On the other hand, there is known a communication scheme for enabling communication between a base station and a communication terminal located outside a communication area of the base station by employing a communication terminal located inside the communication area of the base station as a relay station in a wireless communication system in which communication terminals communicate with the base station, (for example, see Patent Document 2).

Patent Document 1: Japanese Patent Publication No. 2002-171287

Patent Document 2: Japanese Patent Publication No. 2003-309512

DISCLOSURE OF THE INVENTION

Problem to be Solved by the Invention

However, the wireless communication system disclosed in Patent Document 1 has a problem in that the downlink transmission speed is lowered since a reception state of a communication terminal is deteriorated when an obstacle such as a high building or the like is present between a base station and the communication terminal. For example, even between communication terminals within the same building, a downlink transmission speed may largely vary and a very low transmission speed may be only obtained in a reception position, and also an idle state may be entered without data communication regardless of a good reception position. In this situation, there is a problem in that a user must use a low downlink transmission speed and a communication provider may not effectively use communication equipment.

An object of the invention is to provide communication terminals capable of receiving communication information addressed to a local station from a base station at a higher transmission speed than that of the local station by setting a communication terminal having a higher transmission speed to a relay station among multiple communication terminals in a range in which the communication terminals can communicate with each other, and a mobile communication system having the same.

Means for Solving Problem

The invention has been designed to address the above problems. In accordance with a first aspect of the invention, there is provided a communication terminal that requests a base station to transmit downlink communication information based on a transmission speed of a local station while the local station and a remote station wirelessly communicate with each other, the communication terminal including: a communication device for performing wireless communication with the base station; a transmission speed computing device for computing a transmission speed in the wireless communication with the base station according to a reception state in the wireless communication with the base station; a second communication device for performing wireless communication with the remote station; a transmission speed comparing device for acquiring information on a transmission speed in wireless communication between the remote station and the base station by means of the second communication device and comparing the transmission speed of the remote station obtained thereby and the transmission speed computing device; and a relay requesting device for requesting the remote station to provide the base station with a transmission request for transmitting information addressed to the local station from the base station to the remote station, by means of the second communication device, if the transmission speed of the remote station is higher than that of the local station as a result of the comparison by the transmission speed comparing device. Here, the information addressed to the local station transmitted from the base station to the remote station is obtained by the second communication device if the relay requesting device has made the request.

Therefore, the communication information addressed to the local station can be received from the base station at a higher transmission speed of the remote communication terminal than that of the local station by setting the remote communication terminal having the higher transmission speed to a relay station among multiple communication terminals in a range in which the communication terminals can communicate with each other. With an increase in convenience to users, total throughput can be improved in terms of the base station and the use efficiency of wireless equipment can be increased.

In accordance with a second aspect of the invention, the relay requesting device may send the request by providing the remote station with identification information to be used for the base station to identify the local station or the remote station. Therefore, the communication terminal can acquire the communication information addressed to the local station from the base station via the remote station based on the identification information of the local station.

In accordance with a third aspect of the invention, there is provided a communication terminal that requests a base station to transmit downlink communication information based on a transmission speed of a local station while the local station and a remote station wirelessly communicate with each other, the communication terminal including: a communication device for performing wireless communication with the base station; a second communication device for performing wireless communication with the remote station; and a relaying device for sending a request to the base station if the request for transmitting information addressed to the remote station from the base station to the local station has been received from the remote station through the second communication device, and providing the remote station with communication information addressed to the remote station through the second communication device, the communication information addressed to the remote station being transmitted from the base station to the local station in response to the request.

Therefore, the communication terminal can certainly receive a relay request from the remote station via the second communication device for performing the wireless communication with the remote station, and can certainly perform a relay function for the remote station.

In accordance with a fourth aspect of the invention, the communication terminal may further comprise: a transmission speed computing device for computing a transmission speed in wireless communication with the base station according to a reception state in the wireless communication with the base station, wherein the relaying device transmits information on the transmission speed of the local station computed in the transmission speed computing device to the remote station through the communication device if the communication information addressed to the local station is absent.

Therefore, the communication terminal can more certainly perform a relay function for the remote station.

In accordance with a fifth aspect of the invention, the communication terminal, may further comprise: a control device for controlling the communication device to stop the wireless communication with the base station if the second communication device acquires the communication information addressed to the local station from the remote station.

In accordance with a sixth aspect if the invention, there is provided a mobile communication system comprising a first communication terminal (local station) and a second communication terminal (remote station) that wirelessly communicate with each other and a base station that is requested by the communication terminals to transmit downlink communication information based on transmission speeds of the communication terminals (first and second communication terminals). Here, the first communication terminals comprises: a communication device for performing wireless communication with the base station; a transmission speed computing device for computing a transmission speed in the wireless communication with the base station according to a reception state in the wireless communication with the base station; a second communication device for performing wireless communication with the second communication terminal; a transmission speed comparing device for acquiring information on a transmission speed in wireless communication between the second communication terminal and the base station by means of the second communication device and comparing the transmission speed of the second communication terminal obtained thereby and the transmission speed of the first communication terminal computed in the transmission speed computing device; and a relay requesting device for requesting the second communication terminal to provide the base station with a transmission request for transmitting information addressed to the first communication terminal from the base station to the second communication terminal, by means of the second communication device, if the transmission speed of the second communication terminal is higher than that of the first communication terminal as a result of the comparison by the transmission speed comparing device. Here, the relay requesting device sends the request by providing the second communication terminal with identification information to be used for the base station to identify the first communication terminal or the second communication terminal, the second communication terminal including: a relaying device for sending the request to the base station if the request has been received from the first communication terminal, and the base station including: a local/other station identifying/transmitting device for providing the second communication terminal with communication information addressed to the first communication terminal based on the identification information of the first communication terminal obtained according to the request from the second communication terminal. In addition, the relaying device of the second communication terminal provides the first communication terminal with the communication information addressed to the first communication terminal if the communication information addressed to the first communication terminal has been received from the base station.

Therefore, the communication information addressed to the local station can be received from the base station at a higher transmission speed than that of the local station by setting a communication terminal having a higher transmission speed to a relay station among multiple communication terminals in a range in which the communication terminals can communicate with each other. In addition to the increased convenience to users, total throughput can be improved in terms of the base station and the use efficiency of wireless equipment can be increased.

In accordance with a seventh aspect of the invention, in the mobile communication system, the communication terminal may further comprise: a transmission speed computing device for computing a transmission speed in wireless communication with the base station according to a reception state in the wireless communication with the base station, wherein the relaying device transmits information on the transmission speed of the second communication terminal computed in the transmission speed computing device to the first communication terminal if communication information addressed to the second communication terminal is absent.

In accordance with an eighth aspect of the invention, in the mobile communication system, the base station may comprise: a scheduling device for determining transmission sequences and communications traffics relative to the first and second communication terminals based on the transmission speeds relative to previous communications traffics of the first and second communication terminals; and a communications traffic correcting device for treating the communication information transmitted to the second communication terminal having relayed the information as that transmitted to the first communication terminal having made a relay request, when computing the previous communications traffics of the first and second communication terminals.

Since the communication terminal for performing a relay function is not unfavorably treated in scheduling, a user can willing to keep turning on the communication terminal even when the communication terminal is not used, total throughput can be improved in terms of the base station, and the use of efficiency of wireless equipment can be increased.

In accordance with a ninth aspect of the invention, in the mobile communication system, the communications traffic correcting device may subtract a communications traffic based on the communication information transmitted to the second communication terminal having relayed the information from a previous communications traffic of the second communication terminal having relayed the information, and add the subtracted communications traffic to a previous communications traffic of the first communication terminal having made a relay request.

Since the communications traffic based on the communication information transmitted to the communication terminal having relayed the information is subtracted from the previous communications traffic of the communication terminal having relayed the information, the communication terminal for performing a relay function can be favorably treated in scheduling therefor as the relay function is performed. A user can willing to keep turning on the communication terminal even when the communication terminal is not used, total throughput can be improved in terms of the base station, and the use efficiency of wireless equipment can be increased.

In accordance with a tenth aspect of the invention, in the mobile communication system, the first communication terminals may comprise a control device for controlling the communication device to stop the wireless communication with the base station if the second communication device acquires the communication information addressed to the first communication terminal from the second communication terminal.

In accordance with an eleventh aspect of the invention, in the mobile communication system, the control device of the communication terminals may control the communication device to stop the wireless communication with the base station if the second communication device acquires the communication information addressed to the local station from the remote station.

Advantageous Effect of the Invention

According to the invention, communication information addressed to a local station can be received from a base station at a higher transmission speed than that of the local station by setting a communication terminal having a higher transmission speed to a relay station among multiple communication terminals in a range in which the communication terminals can communicate with each other. In addition to the increased convenience to users, total throughput can be improved in terms of the base station and the use efficiency of wireless equipment can be increased.

BRIEF DESCRIPTION OF THE DRAWINGS

FIG. 5 illustrates an example of an extended DRC frame to which a Media Access Control (MAC) address is added.

Figure 1:
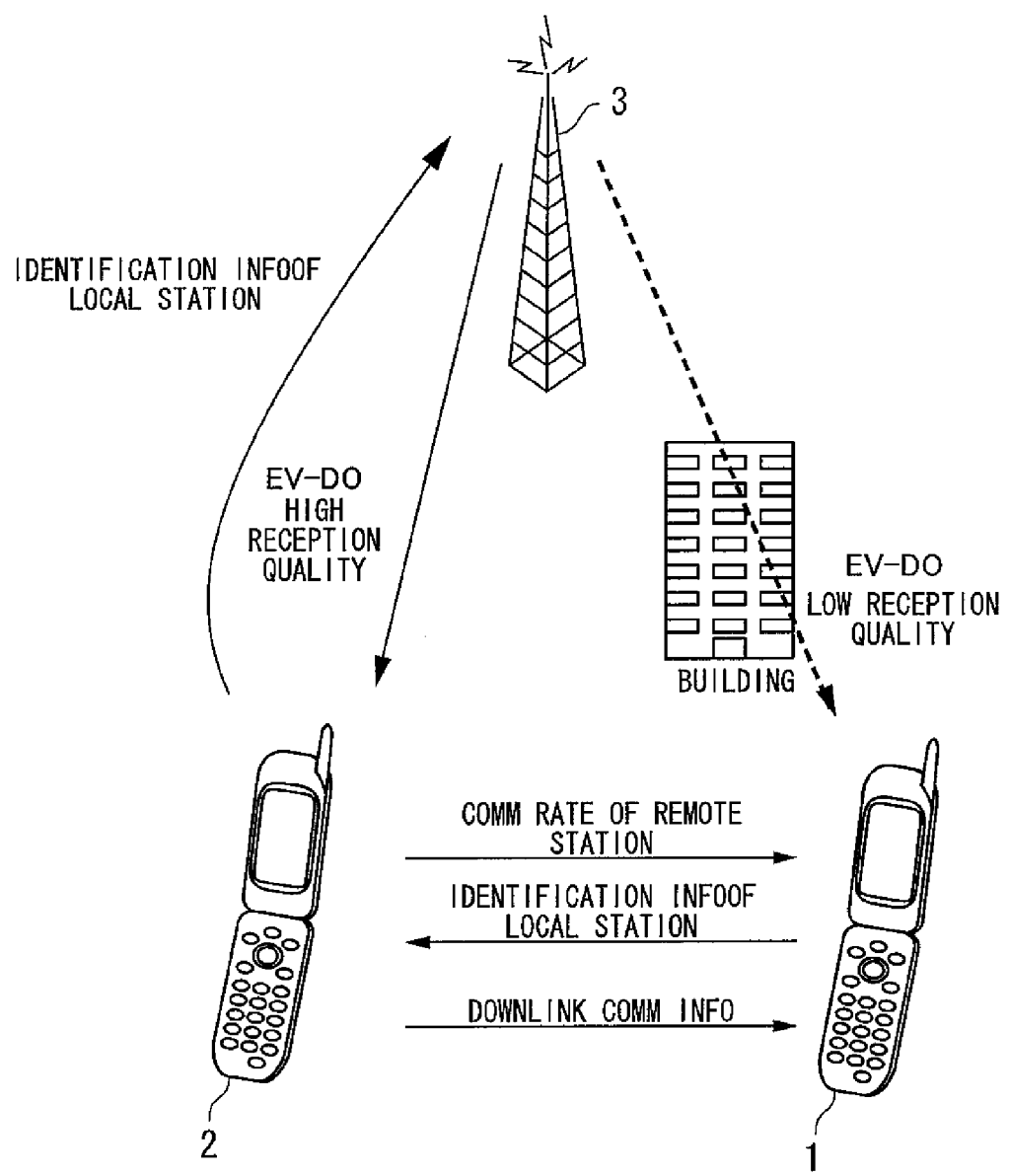
FIG. 1 illustrates a positional relationship between a base station and communication terminals.

DESCRIPTION OF REFERENCE NUMERALS 1, 2: Communication Terminal (Mobile Communication TERMINAL)
3: Base Station
10, 11: Antenna
12: Transceiver for Base Station
13: Wireless Lan Transceiver
14: Audio Processor
15: Speaker
16: Microphone
17: Screen Display Unit
18: Operation Key
20: Memory
21: Controller
22: Reception Quality Measuring Section
23: Transmission Speed Computing Section
24: Transmission Speed Information Exchanging Section
25: Communication Terminal Selecting Section
31: Scheduler
32: Local/Other Station Identifying/Transmitting Section
33: Communications Traffic Correcting Section

BEST MODE FOR CARRYING OUT THE INVENTION

Hereinafter, preferred embodiments of the invention will be described with reference to the accompanying drawings. However, the invention is not limited to the following embodiments. For example, it is desirable to appropriately combine components of the embodiments.

Now, communication terminals and a mobile communication system in accordance with an embodiment of the invention will be described with reference to the accompanying drawings. First, an overall structure of the system will be described with reference to FIG. 1. FIG. 1 illustrates a positional relationship among a base station 3, a local mobile communication terminal (hereinafter, referred to as a "communication terminal"), and a remote communication terminal. In an example of a mobile communication system using a communication scheme (for example, Code Division Multiple Access 2000 1×Evolution-Data Optimized (CDMA2000 1×EV-DO) scheme) for controlling the data transmission speed according to a reception state of a communication terminal as described below, an obstacle such as a building or the like is located between the local communication terminal 1 and the base station 3, the local communication terminal 1 is in a communication state of low reception quality with respect to the base station 3, and the remote communication terminal 2 has high reception quality with respect to the base station 3. The communication terminals 1 and 2 as illustrated in FIG. 1 have a communication function in which the communication terminals 1 and 2 can directly communicate with each other using an ad hoc mode corresponding to one of wireless LAN communication schemes without involving an access point.

In addition, only two communication terminals are illustrated in FIG. 1. The invention is not limited to the two communication terminals, and can use at least three communication terminals.

Now, the terminology used in this specification and the claims will be described.

A local station and a remote station are logical names representing states in which communication terminals are located. The local station is a communication terminal in a relatively low reception quality state and the remote station is a communication terminal in a relatively high reception quality state. As a rule, the local station is the communication terminal that requests the remote station to relay downlink communication information, and the remote station is the communication terminal that receives the relay request from the local station and transmitting the downlink communication information to the local station by relaying the downlink communication information from the base station 3. Consequently, the local station should comprise at least a relay requesting device for sending the relay request to the remote station and the remote station should comprise at least a relaying device for relaying the downlink communication information to the local station. In an example as illustrated in FIG. 1, the communication terminal 2 is the remote station and the communication terminal 1 is the local station. The two communication terminals 1 and 2 can comprise both the relay requesting device and the relaying device, respectively. When an obstacle such as a building or the like is absent between the base station 3 and the communication terminal 1 and is present between the base station 3 and the communication terminal 2, the communication terminal 2 serves as the local station and the communication terminal 1 serves as the remote station. The reception state is the quality of a signal received from the base station in the communication terminal (or a Carrier to Interference Ratio (CIR)). The transmission speed is a downlink transmission speed (DRC) at which reception is possible and is computed from the CIR in the communication terminal. The communication information is traffic data. A transmission request includes the local station's identification information (or Media Access Control (MAC) address) and the remote station's transmission speed and is used to send a downlink communication information transmission request from the local station to the base station via the remote station.

Figure 2:
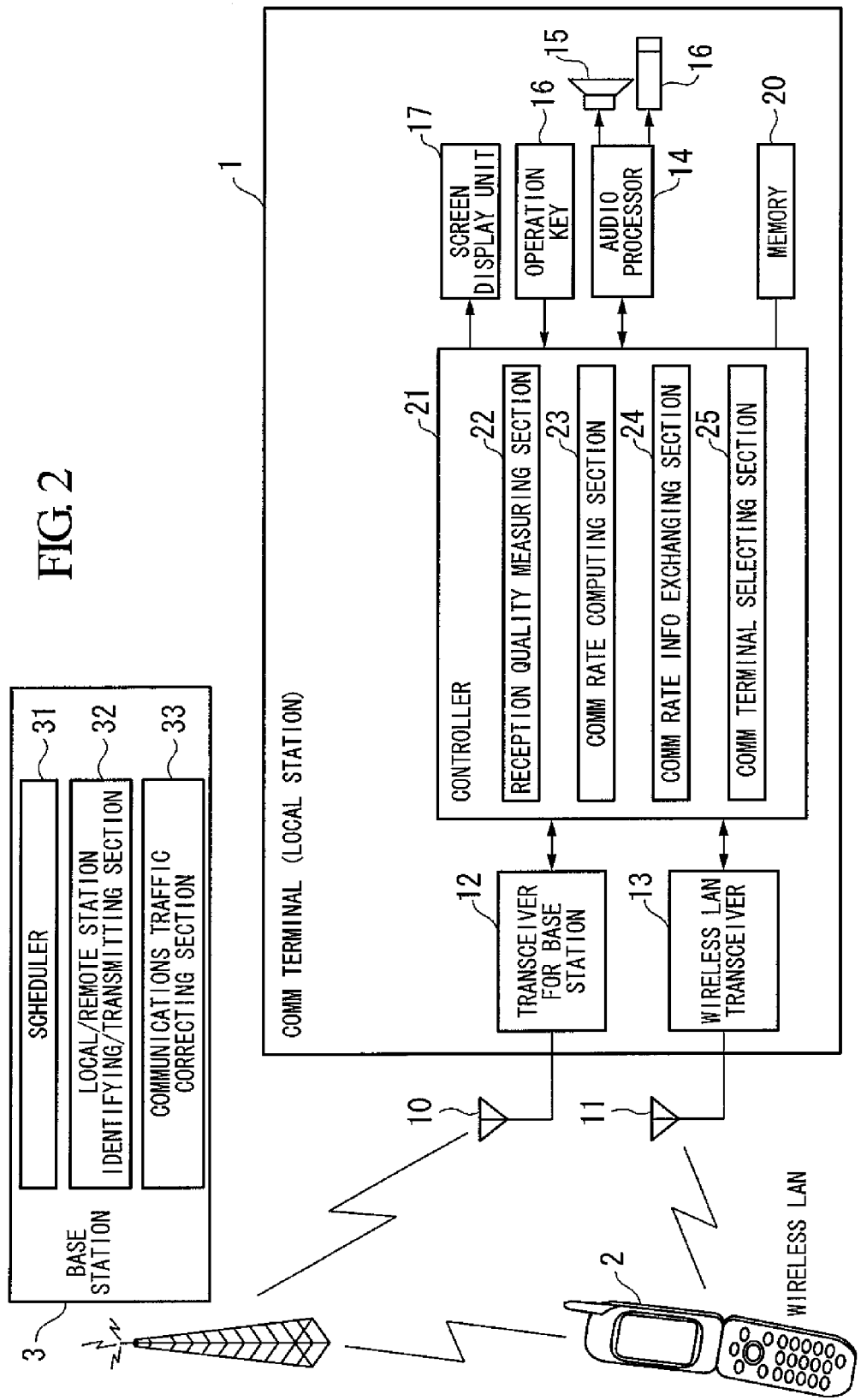
FIG. 2 illustrates an example of a mobile communication system in accordance with the invention.

Next, structures of the communication terminal 1 and the base station 3 as illustrated in FIG. 1 will be described with reference to FIG. 2. Since the structure of the communication terminal 2 as illustrated in FIG. 1 is the same as that of the communication terminal 1, a detailed description is omitted. FIG. 2 is a block diagram illustrating the structures of the communication terminal 1 and the base station 3 as illustrated in FIG. 1. In FIG. 2, a transceiver 12 for the base station 3 is a circuit for performing transmission/reception processing relative to the base station 3 under control of a controller 21 in the communication terminal 1. An antenna 10 is connected to the transceiver 12 for the base station. Further, the transceiver 12 for the base station is a structure corresponding to the "communication device" as described in the fourth/tenth aspect of the invention. A wireless Local Area Network (LAN) transceiver 13 is a circuit for performing transmission/reception processing for a wireless LAN relative to the remote communication terminal (herein, the communication terminal 2) under the control of the controller 21. An antenna 11 is connected to the wireless LAN transceiver 13. The wireless LAN transceiver 13 is a structure corresponding to the "other communication device" as described in the fourth/tenth aspect of the invention.

The controller 21 performs call processing in voice communication and transmission/reception processing of electronic mail and the like by controlling the transceiver 12 for the base station, a screen display unit 17, an operation key 18 and a audio processor 14 and also controls the wireless LAN transceiver 13 to process communication with the communication terminal of the remote station. Moreover, the controller 21 serves as a main function unit for implementing a function of the invention and is constructed with a reception quality measuring section 22, a transmission speed computing section 23, a transmission speed information exchanging section 24, a communication terminal selecting section 25, and the like. Moreover, the controller 21 is a structure corresponding to the "control device" as described in the fourth/tenth aspect of the invention.

The reception quality measuring section 22 performs a process for receiving a downstream pilot signal and measuring reception quality (CIR). The transmission speed computing section 23 performs a process for computing a receivable downlink transmission speed (DRC) from the measured reception quality (CIR). The transmission speed information exchanging section 24 performs a process for exchanging information of a receivable downlink transmission speed through the wireless LAN between the communication terminals. The communication terminal selecting section 25 performs a process for selecting the remote communication terminal 2 to which a relay request is sent when there is the remote communication terminal 2 whose receivable downlink transmission speed is higher than that of the local station.

The audio processor 14 is a circuit for encoding/decoding a voice signal and is connected to a speaker 15 and a microphone 16. A memory 20 stores a program to be executed by the controller 21 and the like and is used to store received data.

In the structure of the communication terminal 1, the reception quality measuring section 22 measures a reception state of the local station and the transmission speed computing section 23 computes a receivable downlink transmission speed. Moreover, the transmission speed computing section 23 is a structure corresponding to the "transmission speed computing device" as described in the fourth/tenth aspect of the invention. If communication information addressed to the local station is absent and communication information for the remote station can be relayed, the transmission speed information exchanging section 24 reports a receivable downlink transmission speed to an adjacent communication terminal with which direct communication is possible. If not, the transmission speed information exchanging section 24 receives information of a receivable downlink transmission speed from an adjacent communication terminal. The communication terminal selecting section 25 compares the receivable downlink transmission speed of the local station with those of remote stations and selects the remote station having a highest receivable downlink transmission speed. If the number of remote stations 2 is only one as illustrated in FIGS. 1 and 2, the receivable downlink transmission speeds of the local station and the remote station are compared and it is only determined whether the receivable downlink transmission speed of the remote station is higher than that of the local station. Moreover, the communication terminal selecting section 25 is a structure corresponding to the "transmission speed comparing device" as described in the fourth/tenth aspect of the invention.

A controller of the base station 3 is constructed with a scheduler 31, a local/other station identifying/transmitting section 32, a communications traffic correcting section 33, and the like. The scheduler 31 performs a process for determining a transmission sequence and transmission traffic of downstream traffic data (communication information) based on "a requested transmission traffic (or requested speed) with respect to an average of previous communications traffics (computed in a predefined time or a predefined algorithm)" in Proportional Fair and the like. The local/other station identifying/transmitting section 32 receives a transmission request including identification information of the local station from the remote communication terminal 2, checks the identification information of the local communication terminal 1 having made a relay request from header information of the request, and performs a process for transmitting downstream traffic data (communication information) to the local communication terminal 1 having made the relay request via the remote communication terminal 2 having relayed the information.

When computing a previous communications traffic relative to each communication terminal, the communications traffic correcting section 33 treats a communications traffic of downstream traffic data transmitted to the relay communication terminal (or the remote communication terminal 2) as that transmitted to the communication terminal (or the local communication terminal 1) having made the relay request. Specifically, the communications traffic correcting section 33 performs a process for subtracting the above described communications traffic (or the relay communications traffic) from the previous communications traffic of the remote communication terminal 2 having relayed the information and adding the above described communications traffic (or the relay communications traffic of the remote station) to the previous communications traffic of the local communication terminal 1 having made the relay request.

Figure 3:
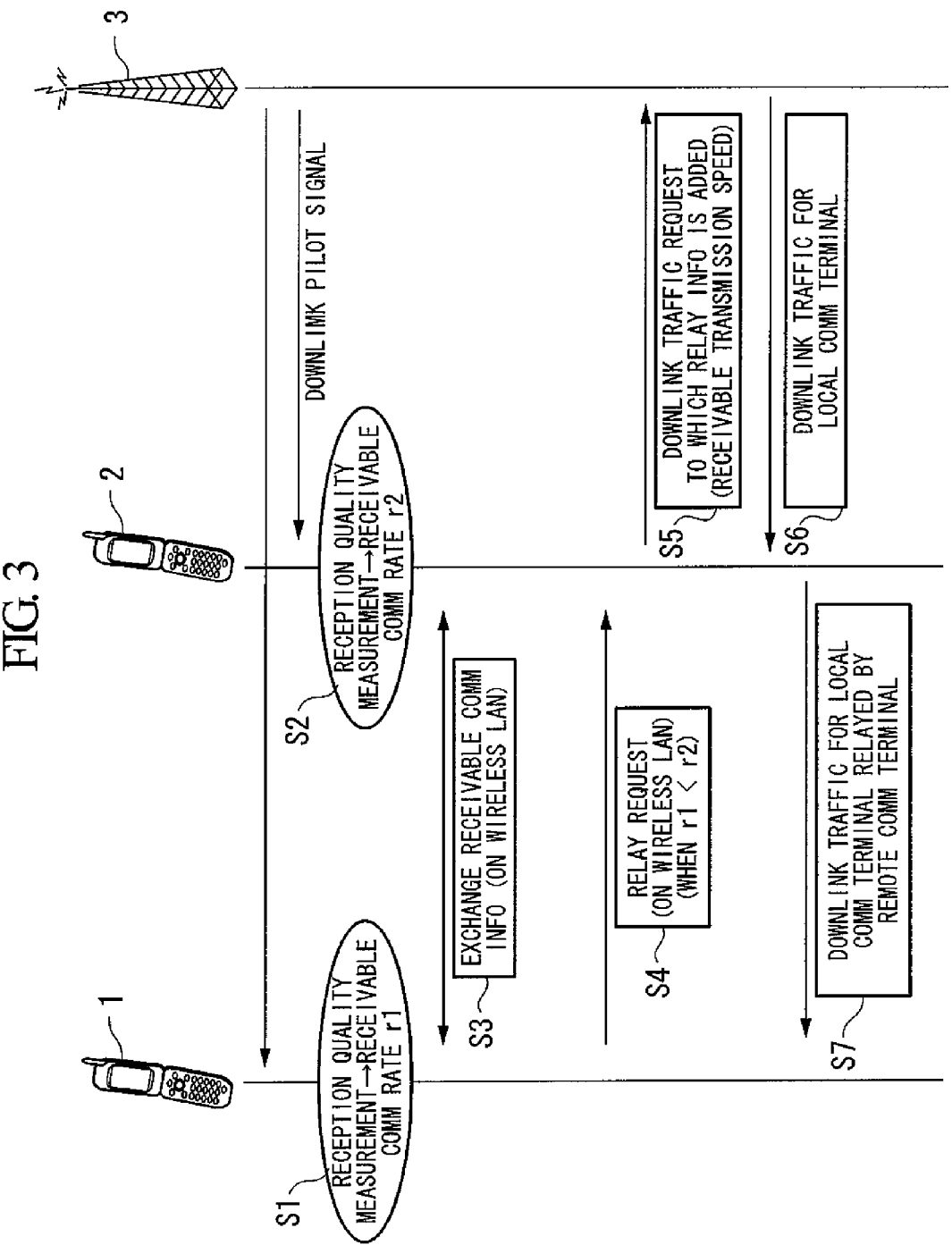
FIG. 3 illustrates a communication operation between respective stations.

FIG. 3 illustrates a communication operation between respective stations. Next, a communication operation among the two communication terminals 1 and 2 and the base station 3 will be described with reference to FIG. 3. Herein, it is described that the local communication terminal 1 is in a state in which the communication terminal 1 needs to receive downstream traffic data from the base station 3 and the remote communication terminal 2 is located within a communication area of the base station 3, but is in a state in which the communication terminal 2 itself does not need to receive downstream traffic data.

First, the communication terminal 1 receives a downstream pilot signal from the base station 3 to measure a reception state and computes a receivable downlink transmission speed r1 (step S1). Then, the communication terminal 2 also receives a downstream pilot signal from the base station 3 to measure a reception state and computes a receivable downlink transmission speed r2 (step S2). The communication terminal 1 and the communication terminal 2 mutually exchange information of the receivable downlink transmission speeds r1 and r2 in a rule. However, herein the communication terminal 1 only receives the downlink transmission speed r2 of the remote station from the communication terminal 2 without transmitting the downlink transmission speed r1 of the communication terminal 1 to the communication terminal 2 since the communication terminal 1 is not in a state in which the relay is possible (step S3). If the communication terminal 1 has determined that r1<r2, a relay request including a MAC address (identification information) of the communication terminal 1 is sent from the communication terminal 1 to the communication terminal 2 (step S4). Herein, the MAC address is an address (or code) for identifying each communication terminal communicating with the base station 3 in an EV-DO scheme. Upon receiving the relay request from the communication terminal 1, the communication terminal 2 provides the base station 3 with a downstream traffic request (or transmission request) to which the MAC address (relay information) is added (step S5). The base station 3 transmits "downstream traffic data for the base station 1" to the communication terminal 2 (step S6). Upon receiving the downstream traffic data, the communication terminal 2 relays the "downstream traffic data for the communication terminal 1" received from the base station 3 through the wireless LAN and transmits the data to the communication terminal 1 (step S7).

A transmission of a receivable downlink transmission speed is performed when the local communication terminal 1 is in a state in which the relay is possible such that the relay from the remote communication terminal 2 is not requested. The local communication terminal 1 directly communicates with the base station 3 if there is not a communication terminal in which the relay is possible even though there is the remote communication terminal 2 capable of directly communicating with the local communication terminal 1.

Thus, the mobile communication system and the communication terminals in accordance with the invention can achieve a high downlink transmission speed by setting a communication terminal of the best reception state to a relay station among multiple communication terminals present in a range in which direct communication is possible and can improve the convenience to users. Moreover, the invention can improve total throughput (or sector throughput) in terms of a base station and can increase the use efficiency of wireless equipment.

Figure 4:
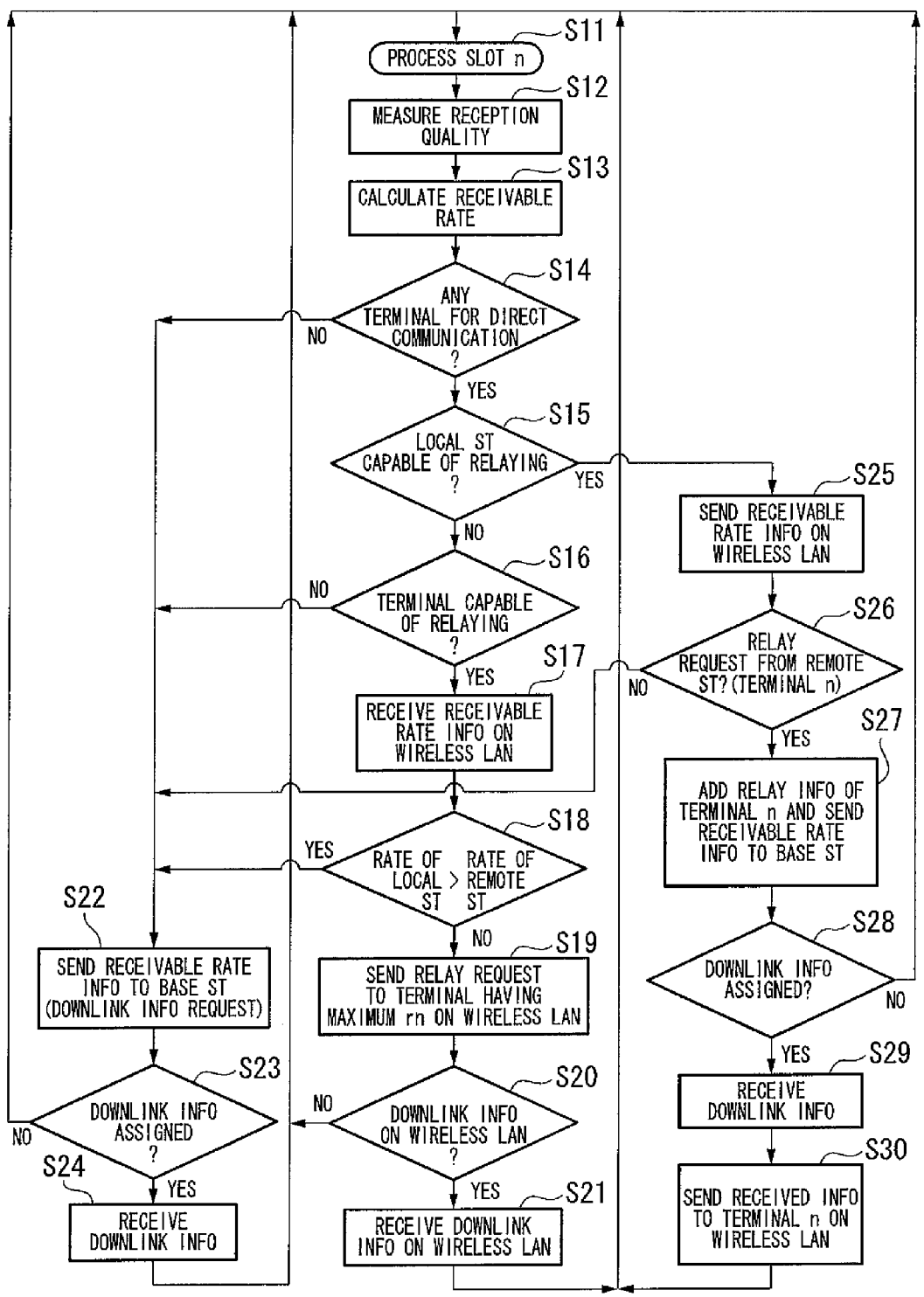
FIG. 4 is a flowchart illustrating a communication operation of a communication terminal.

Next, an internal processing operation of the communication terminal 1 will be described with reference to FIG. 4. FIG. 4 is a flowchart illustrating the operation of the communication terminal 1. The flowchart of FIG. 4 illustrates the processing operation when the communication terminal 1 comprises both the relay requesting device and the relaying device.

First, the communication terminal 1 initiates an operation for processing a slot n (step S11). The communication terminal 1 measures a reception state through a downstream pilot signal from the base station 3 (step S12), and calculates a receivable downlink transmission speed (step S13).

Next, the communication terminal 1 determines whether there is a remote communication terminal 2 with which direct communication is possible through the wireless LAN (step S14). Upon determining that there is not a remote communication terminal 2 with which direct communication is possible through the wireless LAN in step S14, the communication terminal 1 sends a signal including receivable downlink communication information of the local station to the base station 3 and requests a transmission of downstream traffic data (or communication information addressed to the local station) (step S22). If the downstream traffic data has been assigned, the communication terminal 1 receives the downstream traffic data from the base station 3 (steps S23 and S24). If the downstream traffic data has not been assigned, the communication terminal 1 returns to the first step S11.

On the other hand, upon determining that there is the remote communication terminal 2 with which direct communication is possible through the wireless LAN in step S14, the communication terminal 1 (or local station) determines whether the relay is possible (step 815). When the local station determines that the relay is impossible in step 815, the local station proceeds to step S16 to determine whether there is a communication terminal 2 in which the relay is possible. If there is not a communication terminal 2 in which the relay is possible, the local station proceeds to step S22 to perform a process for receiving downstream traffic data therein. Upon determining that there is the communication terminal 2 in which the relay is possible in step S16, the local station receives a receivable downlink transmission speed from the communication terminal 2 in which the relay is possible on the wireless LAN (step S17).

Then, the communication terminal 1 compares a receivable downlink transmission speed r1 of the local station and a receivable downlink transmission speed r2 of the remote station (step S18). When the receivable downlink transmission speed r1 of the local station is greater than the receivable downlink transmission speed r2 of the remote station, the communication terminal 1 proceeds to step S22 to perform a process for receiving downstream traffic data in the local station. When the receivable downlink transmission speed r1 of the local station is less than the receivable downlink transmission speed r2 of the remote station in step S18, the communication terminal 1 sends a relay request to a communication terminal (herein, the communication terminal 2) in which a maximum receivable downlink transmission speed rn is highest (step S19). If downstream traffic data is present on the wireless LAN, the communication terminal 1 receives the downstream traffic data on the wireless LAN (steps S20 and S21).

On the other hand, upon determining that the relay is possible in step S15, the local station proceeds to step S25 to transmit the receivable downlink transmission speed r1 on the wireless LAN to the remote communication terminal 2. Then, the local station determines whether there is a relay request from a remote communication terminal n (or a remote station making the relay request) (step S26). If the relay request is absent, the local station proceeds to step S22. If the relay request is present, the local station transmits its receivable downlink transmission speed r1 to the base station 3 by adding a MAC address serving as identification information of the communication terminal n (step S27).

Then, the communication terminal 1 determines whether downstream traffic data has been assigned (step S28). If the downstream traffic data has been assigned, the communication terminal 1 receives the downstream traffic data (step S29) and transmits the received downstream traffic data to the communication terminal n on the wireless LAN (step S30). Upon determining that the downstream traffic data is not assigned in step S28, the communication terminal 1 returns to the first step S11.

According to the processing operation as described above, communication can be performed by setting a communication terminal having a highest transmission speed to a relay station among multiple communication terminals present in a range in which direct communication is possible and the convenience to users can be increased. Moreover, total throughput can be improved in terms of the base station, and the use efficiency of wireless equipment can be increased.

In addition, when the communication terminal 1 sends a relay request to the communication terminal 2, the communication terminal 1 requests the communication terminal 2 to relay downstream traffic data addressed to the local station using the wireless LAN. In response to the request, the remote communication terminal 2 sends a transmission request to the base station 3 by including and adding a receivable downlink transmission speed of the remote station (or the communication terminal 2 itself) and the identification information (or MAC address) of the communication terminal (of the local station) serving as header information.

FIG. 5 illustrates an extended DRC frame to which a MAC address is added. A transmission is performed by including a MAC address (6 bits) of the communication terminal 1 making a relay request as header information and extending 4 bits of a DRC symbol in a DRC subchannel on an upstream traffic data channel from the communication terminal 2 to the base station 3. MAC address information is loaded by puncturing a part of the DRC subchannel. Alternatively, a method for loading MAC address information by puncturing a part of a pilot subchannel and the like can be used.

When transmitting downstream traffic data addressed to a communication terminal based on scheduling, the base station 3 provides the communication terminal with the downstream traffic data at a requested receivable downlink transmission speed. In this case, a header indicating that the data is addressed to the communication terminal can be added to the downstream traffic data. Alternatively, an increase in overhead of the traffic data can be avoided when the header is not added since the communication terminal knows that a downstream data request mapped to the downstream traffic data to be received is the request of the communication terminal.

Each communication terminal can transmit the downstream traffic data received from the base station 3 to a communication terminal through the wireless LAN. The communication terminal can receive the downstream traffic data on the wireless LAN. In this case, the base station 3 performs scheduling. The scheduling process is performed based on a Proportional Fair algorithm as described below.

In relation to all communication terminals communicating with the base station 3, the base station 3 stores an average $Ri(n)$ of transmission speeds at previous allocation and updates the average $Ri(n)$ at a predetermined timing (1/600 sec).

$$Ri(n)=(1-1/tc) \times Ri(n-1)+1/tc \times ri(n-1)$$

Herein, $Ri(n)$ is an average data transmission speed in a slot n for a communication terminal i, $ri(n)$ is a transmission data transmission speed in a slot n for a communication terminal i and is 0 when downstream traffic is not assigned to the communication terminal i, and tc (i) is a time constant.

The base station 3 computes the following evaluation function at a time n of the communication terminal i.

$$Fi(n)=DRCi (n)/Ri(n),$$

where $DRCi (n)$ is a request data transmission speed in the slot n of the communication terminal i, or a receivable downlink transmission speed, to be transmitted to the base station, computed in the communication terminal.

The base station 3 evaluates $Fi(n)$ of each communication terminal at the transmission timing (every 1/600 sec) and assigns downstream traffic data to a communication terminal in which $Fi(n)$ is largest.

In the evaluation calculation process as described above, $ri(n)$ is an actually transmitted transmission speed when a communication terminal i (or the communication terminal 1) has directly communicated with the base station 3. When the communication terminal i communicates by setting a communication terminal j (or the communication terminal 2) to a relay station and downstream traffic from the base station 3 is actually assigned to the communication terminal j, rj(n)=0 and ri(n) is set to a transmission speed actually transmitted to the communication terminal j (but ri(n)=0 and rj(n) is set to an actually transmitted transmission speed in the prior art).

When rj(n)=0 and ri(n) is set to the transmission speed actually transmitted to the communication terminal j, $$Ri(n)=(1-1/tc)\times Ri(n-1)+1/tc\times rj(n-1),$$

$$Rj(n)=(1-1/tc)\times Rj(n-1)+1/tc\times rj(n-1).$$

Further, the following correction is applied to the calculation of Ri(n).

When the communication terminal i communicates with the base station by setting the communication terminal j to the relay station at a time n−1 and the base station 3 assigns downstream traffic to the communication terminal j, $$Ri(n)=(1-1/tc)\times Ri(n-1)+1/tc\times rj(n-1)\times(1+c),$$

$$Rj(n)=(1-1/tc)\times Rj(n-1)+1/tc\times rj(n-1)\times(-c),$$

where c is a correction coefficient of 0.1~0.5.

That is, an average data rate of the communication terminal i relayed and received from the communication terminal j is increased by the correction coefficient c and an average data rate of the communication terminal 2 is decreased by c. In the subsequent evaluation function calculation, the communication terminal 2 is more favorably treated than the communication terminal 1. In a similar correction calculation method and the like, the evaluation function can be offset (by decreasing Fi(n) of the communication terminal i and increasing Fi(n) of the communication terminal j).

In the scheduling method as described above, a scheme for compensating for a disadvantage in power consumption and the like in scheduling can be introduced such that a communication terminal for performing a relay function is not unfavorably treated in scheduling.

In addition, a communication terminal (or the local communication terminal 1 as illustrated in FIG. 1) making a request for relaying downlink communication information (traffic data) does not need to necessarily have the relaying device for relaying downlink communication information (traffic data) to an adjacent communication terminal. Further, a communication terminal (or the remote communication terminal 2 as illustrated in FIG. 1) for relaying downlink communication information does not need to necessarily have the relay requesting device for requesting an adjacent communication terminal to relay downlink communication information. In particular, high quality communication can be realized without setting a new base station if an automobile telephone is used for a movable relay station since power consumption becomes less problematic even though downlink communication information (traffic data) is relayed to an adjacent communication terminal when transmission power and power capacity are sufficiently large as in the automobile telephone.

An example of communication terminals (or mobile communication terminals) in the embodiments of the invention has been described above. The communication terminals include a portable telephone, a mobile terminal, a Personal Digital Assistant (PDA), and the like.

INDUSTRIAL APPLICABILITY

The invention can achieve a high downlink transmission speed by setting a communication terminal of the best reception state to a relay station among multiple communication terminals present in a range in which direct communication is possible, improve the convenience to users, and have an effect in which a communication terminal for performing a relay function is not unfavorably treated in scheduling. Therefore, the invention is useful for a mobile communication system, a communication terminal, and the like.

The invention claimed is:

1. A communication terminal that requests a base station to transmit downlink communication information based on a transmission speed of the communication terminal while the communication terminal and a remote station wirelessly communicate with each other, the communication terminal comprising:
a processor;
a communication device for performing wireless communication with the base station;
a transmission speed computing device for computing a transmission speed in the wireless communication with the base station according to a reception state in the wireless communication with the base station;
a second communication device for performing wireless communication with the remote station;
a transmission speed comparing device for acquiring information on a transmission speed in wireless communication between the remote station and the base station by means of the second communication device and comparing the transmission speed of the remote station obtained thereby and the transmission speed of the communication terminal computed in the transmission speed computing device; and
a relay requesting device for requesting the remote station to provide the base station with a transmission request for transmitting information addressed to the communication terminal from the base station to the remote station, by means of the second communication device, if the transmission speed of the remote station is higher than that of the communication terminal as a result of the comparison by the transmission speed comparing device,
wherein the information addressed to the communication terminal transmitted from the base station to the remote station is obtained by the second communication device if the relay requesting device has made the request.

2. The communication terminal of claim 1, wherein the relay requesting device sends the request by providing the remote station with identification information to be used for the base station to identify the communication terminal or the remote station.

3. The communication terminal of claim 1, further comprising: a control device for controlling the communication device to stop the wireless communication with the base station if the second communication device acquires the communication information addressed to the communication terminal from the remote station.

4. A mobile communication system comprising a first communication terminal and a second communication terminal that wirelessly communicate with each other and a base station that is requested by the communication terminals to transmit downlink communication information based on transmission speeds of the communication terminals, the first communication terminal comprising:
a communication device for performing wireless communication with the base station;
a transmission speed computing device for computing a transmission speed in the wireless communication with the base station according to a reception state in the wireless communication with the base station;

a second communication device for performing wireless communication with the second communication terminal;

a transmission speed comparing device for acquiring information on a transmission speed in wireless communication between the second communication terminal and the base station by means of the second communication device and comparing the transmission speed of the second communication terminal obtained thereby and the transmission speed of the first communication terminal computed in the transmission speed computing device; and a relay requesting device for requesting the second communication terminal to provide the base station with a transmission request for transmitting information addressed to the first communication terminal from the base station to the second communication terminal, by means of the second communication device, if the transmission speed of the second communication terminal is higher than that of the first communication terminal as a result of the comparison by the transmission speed comparing device, wherein the relay requesting device sends the request by providing the second communication terminal with identification information to be used for the base station to identify the first communication terminal or the second communication terminal, the second communication terminal comprising: a relaying device for sending the request to the base station if the request has been received from the first communication terminal, and the base station comprising: a local/other station identifying/transmitting device for providing the second communication terminal with communication information addressed to the first communication terminal based on the identification information of the first communication terminal obtained according to the request from the second communication terminal, and wherein the relaying device of the second communication terminal provides the first communication terminal with the communication information addressed to the first communication terminal if the communication information addressed to the first communication terminal has been received from the base station.

5. The mobile communication system of claim 4, wherein the second communication terminal further comprises a transmission speed computing device for computing a transmission speed in wireless communication with the base station according to a reception state in the wireless communication with the base station, and wherein the relaying device transmits information on the transmission speed of the second communication terminal computed in the transmission speed computing device to the first communication terminal if communication information addressed to the second communication terminal is absent.

6. The mobile communication system of claim 4, wherein the base station comprises:

a scheduling device for determining transmission sequences and communications traffics relative to the first and second communication terminals based on the transmission speeds relative to previous communications traffics of the first and second communication terminals; and a communications traffic correcting device for treating the communication information transmitted to the second communication terminal having relayed the information as that transmitted to the first communication terminal having made a relay request, when computing the previous communications traffics of the first and second communication terminals.

7. The mobile communication system of claim 6, wherein the communications traffic correcting device subtracts a communications traffic based on the communication information transmitted to the second communication terminal having relayed the information from a previous communications traffic of the second communication terminal having relayed the information and adds the subtracted communications traffic to a previous communications traffic of the first communication terminal having made a relay request.

8. The mobile communication system of claim 4, wherein the first communication terminal further comprises a control device for controlling the communication device to stop the wireless communication with the base station if the second communication device acquires the communication information addressed to the first communication terminal from the second communication terminal.

* * * * *